(12) United States Patent
Lu et al.

(10) Patent No.: US 12,472,584 B2
(45) Date of Patent: Nov. 18, 2025

(54) METHOD FOR ROUGHENING SURFACE OF METAL MATERIAL BY USING LASER SHOCK FORMING TECHNOLOGY AND APPLICATION THEREOF

(71) Applicant: SHANDONG UNIVERSITY, Shandong (CN)

(72) Inventors: Guoxin Lu, Jinan (CN); Zhong Ji, Jinan (CN); Diangang Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 1013 days.

(21) Appl. No.: 17/618,150

(22) PCT Filed: Mar. 13, 2020

(86) PCT No.: PCT/CN2020/079329
§ 371 (c)(1),
(2) Date: Dec. 10, 2021

(87) PCT Pub. No.: WO2021/077661
PCT Pub. Date: Apr. 29, 2021

(65) Prior Publication Data
US 2022/0234141 A1 Jul. 28, 2022

(30) Foreign Application Priority Data
Oct. 23, 2019 (CN) .......................... 201911013406.2

(51) Int. Cl.
*B23K 26/352* (2014.01)
*B23K 26/0622* (2014.01)
(Continued)

(52) U.S. Cl.
CPC .......... *B23K 26/3584* (2018.08); *B23K 26/18* (2013.01); *B23K 26/356* (2015.10); *B23K 26/0622* (2015.10)

(58) Field of Classification Search
CPC .. B23K 26/3584; B23K 26/356; B23K 26/18; B23K 26/0622
(Continued)

(56) References Cited

U.S. PATENT DOCUMENTS

2006/0091123 A1  5/2006  Chen

FOREIGN PATENT DOCUMENTS

| CN | 1986387 A | * | 6/2007 |
| CN | 101024862 A | | 8/2007 |

(Continued)

OTHER PUBLICATIONS

Jul. 17, 2020 Search Report issued in International Patent Application No. PCT/CN2020/079329.
(Continued)

*Primary Examiner* — Steven W Crabb
*Assistant Examiner* — Alba T Rosario-Aponte
(74) *Attorney, Agent, or Firm* — Oliff PLC

(57) ABSTRACT

A method for processing surfaces of metal materials, and to a method for roughening a surface of a metal material by using a laser shock forming technology and an application thereof. According to the method, based on a pulse-laser-induced force effect, a micron-imprint mold and a nano-imprint mold are first prepared, and then the molds are used as a template to present surface microstructures of the imprint molds on a surface of a to-be-processed material. The method is simple and efficient. In addition, compared with a conventional method, a micron-structures and nano-structures can be quantitatively prepared on a surface of a metal material, and the surface roughness and the prepara-
(Continued)

tion scope are accurate and controllable and can be pre-designed.

10 Claims, 1 Drawing Sheet

(51) Int. Cl.
    *B23K 26/18*     (2006.01)
    *B23K 26/356*     (2014.01)

(58) Field of Classification Search
    USPC .................................................. 219/121.85
    See application file for complete search history.

(56) References Cited

FOREIGN PATENT DOCUMENTS

| | | | |
|---|---|---|---|
| CN | 102407219 A | 4/2012 | |
| CN | 103273194 A | 9/2013 | |
| CN | 104046769 A | 9/2014 | |
| CN | 104878189 A | 9/2015 | |
| CN | 107253148 A | 10/2017 | |
| CN | 109136529 A * | 1/2019 | ........... C21D 10/005 |
| CN | 109226970 A * | 1/2019 | ........... B23K 26/356 |
| CN | 109576484 A * | 4/2019 | ........... C21D 10/005 |
| CN | 110560888 A | 12/2019 | |
| JP | 2009-226479 A | 10/2009 | |
| JP | 2010-219367 A | 9/2010 | |
| JP | 2013-175984 A | 9/2013 | |
| WO | 2008/097374 A2 | 8/2008 | |

OTHER PUBLICATIONS

Jul. 17, 2020 Written Opinion of the International Searching Authority issued in International Patent Application No. PCT/CN2020/079329.

Apr. 16, 2020 Office Action issued in Chinese Patent Application No. 201911013406.2.

* cited by examiner

METHOD FOR ROUGHENING SURFACE OF METAL MATERIAL BY USING LASER SHOCK FORMING TECHNOLOGY AND APPLICATION THEREOF

TECHNICAL FIELD

The present invention relates to the field of technologies for processing surfaces of metal materials, and in particular, to a method for roughening a surface of a metal material by using a laser shock forming technology and an application thereof.

BACKGROUND

Information of the Related Art part is merely disclosed to increase the understanding of the overall background of the present invention, but is not necessarily regarded as acknowledging or suggesting, in any form, that the information constitutes the prior art known to a person of ordinary skill in the art.

A superhydrophobic surface is a special surface layer that has an apparent contact angle greater than 150° and a rolling angle less than 10°. A metal superhydrophobic surface of a metal material has water-proof and self-cleaning properties, and can delay icing, corrosion, and the like during the service of the material. In order to change the wetness of a surface of a metal material, for example, prepare the superhydrophobic surface, technicians often need to roughen a surface of a to-be-processed material. Material surfaces having different roughnesses obtained by using different methods generally have inconsistent functional characteristics. Abrasive papers having different numbers of meshes have different surface shapes and corresponding surface roughness values. Generally, the abrasive papers having different numbers of meshes are used to grind the to-be-processed material, so that the surface of the material can have different roughness. However, during research, the inventors found that the surface of the metal material is easily scratched during the grinding, causing changes in a stress state of the surface of the material, thus affecting mechanical properties of the surface of the material. Thus, researchers are required to seek for a more effective and prospective method for preparing a rough surface.

SUMMARY

In view of the problem that a rough surface prepared by using a conventional grinding method is likely to cause degraded service performance and the technical obstacle of difficulty in preparing a rough surface for a part of a metal material, the present invention provides a method for roughening a surface of a metal material based on a pulse laser-induced force effect. By means of the method, a micron-structure and a nano-structure can be prepared on a metal surface, and the surface roughness and the preparation scope are accurate and controllable.

To achieve the foregoing inventive objectives, the technical means used in the present invention are as follows:

First, the present invention discloses a method for roughening a surface of a metal material by using a laser shock forming technology. The method includes:
preparation of an imprint mold, including: shocking abrasive papers by using a laser shock forming technology, and reprinting microstructures on surfaces of the abrasive papers having different numbers of meshes and micron-scale structures and nano-scale structures to a surface of a mold material, to obtain a micron-imprint mold and a nano-imprint mold;
pre-processing of a to-be-roughened material, including: using a smoothed material as a material having a surface to be roughened, where in order to avoid other components during processing, a material of the imprint mold is required to be same as the material having a surface to be roughened, and if the to-be-roughened material is a block material, that is, the to-be-roughened material has a thickness greater than 0.5 mm, a thickness of the imprint mold is required to be less than the thickness of the material having a surface to be roughened;
preparation of a micron-structure on the surface of the to-be-roughened material, including:
(a) placing a side of the micron-imprint mold that has a micron-structure on the surface of the to-be-roughened material, and disposing an absorption layer material and a constraint layer material on a side of the imprint mold that is in a pulse laser incident direction;
(b) performing single-pulse laser shocking on a to-be-processed area by using the laser shock forming technology, to reprint the micron-scale structure on the surface of the imprint mold to the surface of the to-be-roughened material; and
(c) cleaning the to-be-roughened material after the reprinting in step (b) to obtain a surface-micronized material; and
preparation of a nano-structure on the surface of the to-be-roughened material, including:
(d) paving a material capable of reducing a surface energy on a side of the surface-micronized material that has the micron-structure, placing a side of the nano-imprint mold that has a nano-structure on the material capable of reducing the surface energy, and disposing an absorption layer material and a constraint layer material on a surface of the nano-imprint mold; and
(e) performing single-pulse laser shocking on a to-be-processed area by using the laser shock forming technology, to reprint the nano-structure on the surface of the imprint mold to the surface of the to-be-roughed material, and obtain a low-surface-energy coating on the surface; and
(f) cleaning the to-be-roughened material finally obtained in step (e), so as to obtain the nano-structure on the surface of the to-be-roughened material.

A first feature of the preparation method of the present invention is as follows: The pulse laser can cause a plasma explosion on the surface of the material, forming a shocking pressure at a GPa level. When the imprint mold having a specific surface roughness is disposed on the surface of the material having a surface to be roughened, a shock wave effect induced by the pulse laser can reprint the surface shapes of the imprint mold on the material having a surface to be roughened. By means of the prepared imprint molds having micron-structures and nano-structures, the surface of the material can be easily, efficiently, accurately, and controllably micronized and nanosized in advance. The conventional methods lack these advantages. In addition, by means of the method of the present invention, the roughening of a part of the surface of the metal material can be realized without scratches.

A second feature of the preparation method of the present invention is as follows: In the present invention, abrasive papers having different numbers of meshes are used as templates of the imprint molds. By means of laser shocking, the surface of the material can generate surface shapes of the abrasive papers having corresponding numbers of meshes. Then the micron-structures and the nano-structures of the abrasive papers are reprinted on the surface of the material having a surface to be roughened. Such a physical preparation process is significantly different from a convention chemical preparation process and a convention mechanical grinding process.

A third feature of the preparation method of the present invention is as follows: A double-scale rough surface and a low-surface-energy coating material are important factors for preparing a hydrophobic surface. In order to obtain a metal hydrophobic surface, abrasive papers having different surface roughnesses are used for reprinting, so as to process the micron-structures and the nano-structures on the surface of the metal material step by step. In addition, the material capable of reducing surface energy is added to the reprint molds and then compressed into the material having a surface to be roughened by means of shocking, so as to reduce the surface energy. In this way, the micron-structures and the nano-structures having reduced surface energy are obtained. Therefore, a common surface of the material is converted into a hydrophobic surface.

Finally, the present invention discloses applications of a product prepared by using the method for roughening a surface of a metal material by using a laser shock forming technology in anti-snow accumulation and anti-icing of an outdoor metal article, anti-fouling and anti-corrosion of a ship shell, and anti-adhesion and anti-blocking of an inner wall of an oil pipeline in fields such as aerospace, military industries, and transportation.

Compared with the prior art, the present invention achieves the following beneficial effects: According to the method provided in the present invention based on a pulse-laser-induced force effect, a micron-imprint mold and a nano-imprint mold are first prepared, and then the molds are used as a template to present surface microstructures of the imprint molds on a surface of a to-be-processed material. By means of the method, the roughing of the part of the surface of the metal material is realized without scratches. In addition, compared with a conventional method, by means of the method of the present invention, micron-structures and nano-structures can be quantitatively prepared on a metal surface, and the surface roughness and the preparation scope are accurate and controllable and can be pre-designed.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Figure 1:
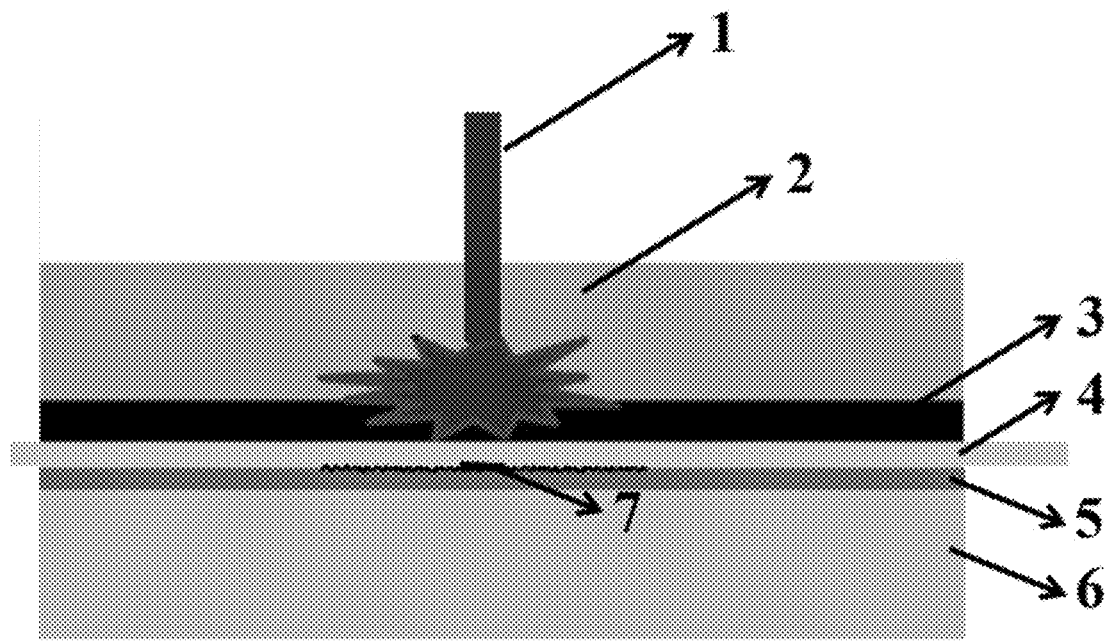
FIG. 1 is a schematic diagram of preparing an imprint mold according to Embodiment 1 of the present invention.

Reference Numerals: 1, 8: Pulse laser beam; 2, 9: Constraint layer; 3, 10: Absorption layer; 4, 12: Imprint mold material; 5, 11: Abrasive paper; 6, 13: Mechanical arm or workbench; 7, 14: Rough surface of imprint mold.

DETAILED DESCRIPTION

It should be pointed out that the following detailed descriptions are all illustrative and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

As described above, scratches are easily caused during roughening of a surface of a metal material by means of mechanical grinding, causing changes in a stress state of the surface of the material, thus affecting mechanical properties of the surface of the material. Thus, the present invention provides a method for roughening a surface of a metal material by using a laser shock forming technology based on a pulse-laser-induced force effect.

In some typical embodiments, a method for preparing a micron-imprint mold includes: using an abrasive paper having a micron-scale microstructure as a base plate, superimposing the mold material with a surface of the base plate that has a micron-structure, disposing an absorption layer material and a constraint layer material on a side in a pulse laser incident direction, and performing shock imprinting by using the laser shock forming technology to reprint the micron-scale microstructure on a surface of the base plate to the surface of the mold material, so as to obtain the micron-imprint mold.

In some typical embodiments, a method for preparing a nano-imprint mold includes: using an abrasive paper having a nano-scale microstructure as a base plate, superimposing the mold material with a surface of the base plate that has a nano-structure, disposing an absorption layer material and a constraint layer material on a side in a pulse laser incident direction, and performing shock imprinting by using the laser shock forming technology to reprint the nano-scale microstructure on a surface of the base plate to the surface of the mold material, so as to obtain the nano-imprint mold.

In some typical embodiments, the micron-structure and the nano-structure on the surfaces of the imprint molds are reprinted by using the abrasive papers having a relatively small number of meshes and a relatively large number of meshes respectively, to obtain a rough surface having a double-scale structure.

Further, an abrasive paper having a relatively small number of meshes is used to reprint the micron-structure, and the imprint mold using an abrasive paper having a relatively large number of meshes is required to form the nano-microstructure. It is to be noted that, the relatively small number of meshes herein are only required to meet a required scale of micron-structure, and the relatively large number of meshes of the abrasive paper are relative to the relatively small number of meshes, and may be selected according to a required scale of nano-structure.

Optionally, a surface roughness of the abrasive paper having a relatively small number of meshes is in a range of Ra0.5 to Ra1, and a surface roughness of the abrasive paper having a relatively large number of meshes is not higher than Ra0.2.

In some typical embodiments, if a to-be-roughened material is a block material having a thickness greater than 0.5 mm, when the imprint mold is foil, a thickness of the imprint mold is required to be less than the thickness of the material having a surface to be roughened, to ensure that the surface of the to-be-processed material can be deformed during laser shocking, so as to reprint the micron-structures and the nano-structures on the surfaces of the imprint molds to the material having a surface to be roughened. If the thickness of the imprint mold is greater than the thickness of the material having a surface to be roughened, the shock wave strength on the surface of the to-be-processed material is excessively high or excessively low.

In some typical embodiments, if a hydrophobic surface or a surface having other functional characteristics is to be prepared on a part of the to-be-roughened material having a thickness less than 0.5 mm, a rough surface of the abrasive paper may be directly reprinted on the foil of the same material as the to-be-roughened material. Then the foil having the rough surface is used as the imprint mold to prepare a rough surface by directly shocking the surface of the to-be-roughened material.

When the imprint mold uses foil, which is generally thin, damage may be caused to the imprint mold as a result of the weaker plastic deformation strength of the imprint mold compared to the to-be-processed material. Therefore, an ultra-thin hard coating is required to be selectively deposited on the rough surface of the imprint mold according to actual processing situations. The ultra-thin hard coating can protect the rough surface of the foil material used as the imprint mold from being damaged.

Thus, in some typical embodiments, if a functional rough surface is to be formed on a sheet material or a block material having thickness greater than 0.5 mm, the rough surface of the abrasive paper is required to be reprinted on the foil same as a material of to-be-processed sheet material, and then a hard coating (for example, an alumina coating) is required to be deposited on the rough surface of the foil, so that the rough surface of the foil material used as the imprint mold is not damaged.

In some typical embodiments, the laser shock forming technology includes one movement by a mechanical arm followed by one shocking by a laser, that is, point-by-point processing.

In some typical embodiments, the smoothing includes mechanical polishing or electrochemical polishing, and is required to be performed before the preparation of a rough surface. In the present invention, a surface roughness value of the surface of the to-be-roughed material is required to be low, that is, the surface roughness of the to-be-roughed material is required to be not greater than a desired surface roughness.

In some typical embodiments, the to-be-processed material is cleaned by means of ultrasonic cleaning.

In some typical embodiments, the absorption layer material is a black paint or a black tape. The absorption layer material is coated or pasted on a surface of a corresponding material that faces a pulse laser incident direction for use.

In some typical embodiments, the constraint layer material is K9 glass or deionized water. The constraint layer material is placed or coated on a surface of the absorption layer.

In some typical embodiments, the material capable of reducing the surface energy includes any of stearic acid, palmitic acid, and N-dodecyl mercaptan.

For example, a hydrophobic surface is prepared on a pure aluminum sample in an area irradiated by a single pulse laser by means of laser shocking. The present invention is further described with reference to FIG. 1 and FIG. 2.

Embodiment 1

Referring to FIG. 1, a method for roughening a surface of a metal material by using a laser shock forming technology includes the following steps.

(I) Preparation of an Imprint Mold, Including the Following Steps:

(1) A pure aluminum foil material having a thickness about 0.05 mm is selected as an imprint mold material, and a pure aluminum plate having a thickness of 2 mm is selected as a material having a surface to be roughed. Surfaces of the pure aluminum foil and the pure aluminum plate are both mechanically polished to be smooth. Before laser shocking, a black paint having a thickness about 0.5 mm is selected as an absorption layer, and K9 glass having a thickness about 3 mm is selected as a constraint layer. A used pulse laser is a circular beam having the following parameters: a wave length of 1064 nm, an energy of 1.2 J, a pulse width of 16 ns, and a diameter of 2 mm. A rough abrasive paper having 200 meshes is used to prepare a micron-imprint mold.

(2) First, the rough abrasive paper 5 having 200 meshes is fixed on a workbench 6 in a laser shock processing system, where a rough side of the abrasive paper is disposed upward. Then a to-be-processed side of the pure aluminum foil (an imprint mold material 4) is placed on a rough surface 7 on a surface of an imprint mold using the abrasive paper. After the above operation is finished, a layer of black paint is coated on an other side of the pure aluminum foil as the absorption layer 3, and then the K9 glass is placed on a surface of the absorption layer as a constraint layer 2.

(3) Single-pulse laser shocking is performed on a to-be-processed area of the to-be-processed aluminum foil by using a laser shock forming technology (a laser beam first reaches the aluminum foil, and then reaches the abrasive paper). The laser shock forming technology includes one movement by a mechanical arm followed by one shocking by a pulse laser beam 1, that is, point-by-point processing.

(4) After the laser shocking, the absorption layer material and the constraint layer material on the surface of the aluminum foil are peeled off. When a surface of the aluminum foil that is in contact with the rough abrasive paper finally becomes a rough surface having a micron-structure of a size of a single laser spot, and a surface state of the obtained rough surface is same as that of the used rough abrasive paper having 200 meshes, a micron-imprint mold is obtained.

(II) Preparation of a Nano-Imprint Mold, Including the Following Steps:

(5) A pure aluminum foil material having a thickness about 0.05 mm and a smooth surface is selected as an imprint mold material. Before laser shocking, a black paint having a thickness about 0.5 mm is selected as an absorption layer, and K9 glass having a thickness about 3 mm is selected as a constraint layer. A used pulse laser is a circular beam having the following parameters: a wave length of 1064 nm, an energy of 1.2 J, a pulse width of 16 ns, and a diameter of 2 mm. A fine abrasive paper having 1000 meshes is used to prepare a nano-imprint mold.

(6) First, the fine abrasive paper 5 having 1000 meshes is fixed on the workbench 6 in the laser shock processing system, where a rough side of the abrasive paper is disposed upward. Then a to-be-processed side of the pure aluminum foil (an imprint mold material 4) is placed on a rough surface 7 on a surface of an imprint mold using the abrasive paper. After the above operation is finished, a layer of black paint is coated on an other side of the pure aluminum foil as the absorption layer 3, and then the K9 glass is placed on a surface of the absorption layer as a constraint layer 2.

(7) Step (3) and step (4) are repeated, and the nano-imprint mold is obtained after steps are finished.

(III) Preparation of a Hard Coating, Including the Following Steps:

After the laser shocking, an alumina coating of 0.1 mm is deposited on the microstructure rough surfaces of the micron-imprint mold and the nano-imprint mold, to increase the strength of the micron-structure rough surface and the nano-structure rough surface of the aluminum foil.

(IV) Micronization of a Surface of a Pure Aluminum Plate, Including the Following Steps:

(a) The pure aluminum plate is fixed on the workbench of the laser shock processing system. A side of the micron-imprint mold prepared in step (4) that has the micron-structure is placed on the surface of the pure aluminum plate. Then, a layer of black paint is coated on a side of the imprint mold in a pulse laser incident direction, and the K9 glass is placed on the black paint.

(b) Single-pulse laser shocking is performed on a to-be-processed area by using the laser shock forming technology (a laser beam first reaches the imprint mold, and then reaches the pure aluminum plate), to reprint the micron-structure on the surface of the imprint mold to the surface of the pure aluminum plate.

(c) The pure aluminum plate after the reprinting in step (b) is cleaned to obtain a surface-micronized material.

(V) Nanonization of the Surface of the Pure Aluminum Plate, Including the Following Steps:

(d) The surface-micronized material obtained in step (c) is fixed on the workbench of the laser shock processing system. A layer of stearic acid is paved on a surface of the surface-micronized material that has the micron-structure, then the nano-imprint mold prepared in step (7) is placed on the stearic acid, a layer of black paint is coated on a side of the imprint mold that is in a pulse laser incident direction, and then the K9 glass is placed on the black paint.

(e) Single-pulse laser shocking is performed on a to-be-processed area by using the laser shock forming technology (a laser beam first reaches the imprint mold, and then reaches the pure aluminum plate), to reprint the nano-structure on the surface of the imprint mold to the surface of the surface-micronized material, and a low-surface-energy coating is pressed on the surface.

(f) The pure aluminum plate after the reprinting in step (e) is cleaned to obtain a surface-micronized and nanonized functional aluminum plate.

Embodiment 2

Figure 2:
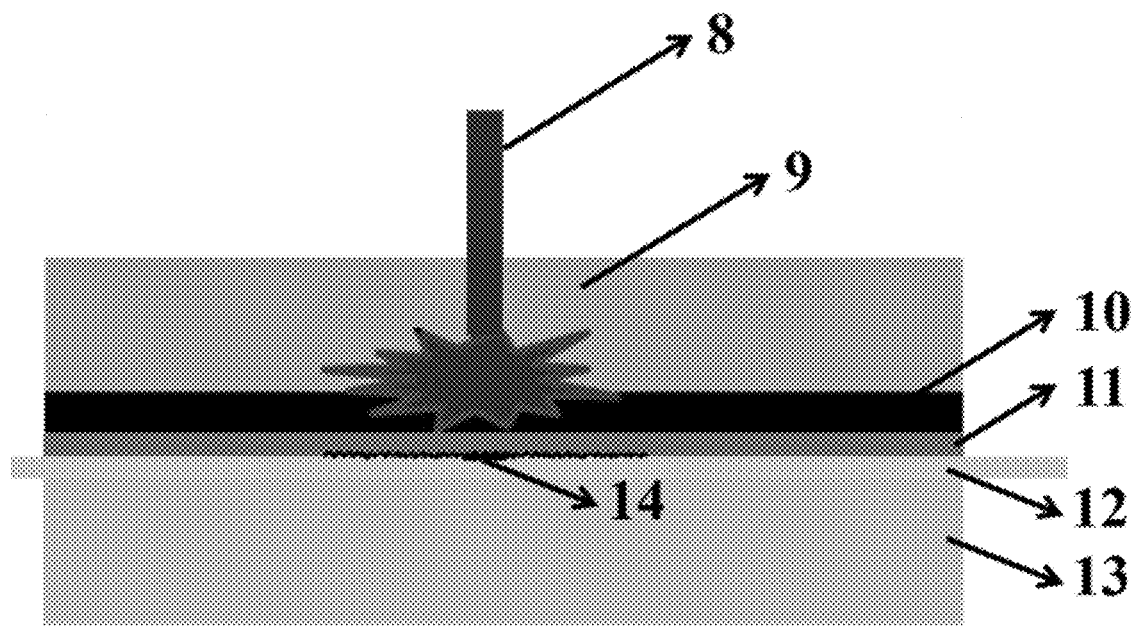
FIG. 2 is a schematic diagram of preparing an imprint mold according to Embodiment 2 of the present invention.

Referring to FIG. 2, a method for roughening a surface of a metal material by using a laser shock forming technology includes the following steps.

(I) Preparation of an imprint mold, including the following steps:

(1) A pure aluminum foil material having a thickness about 0.05 mm is selected as an imprint mold material, and a pure aluminum sheet having a thickness of 0.45 mm is selected as a material having a surface to be roughed. Surfaces of the pure aluminum foil and the pure aluminum sheet are both electrochemically polished to be smooth. Before laser shocking, a black tape having a thickness about 0.5 mm is selected as an absorption layer, and K9 glass having a thickness about 3 mm is selected as a constraint layer. A used pulse laser is a circular beam having the following parameters: a wave length of 1064 nm, an energy of 3.2 J, a pulse width of 16 ns, and a diameter of 2 mm. A rough abrasive paper having 200 meshes is used to prepare a micron-imprint mold.

(2) First, the pure aluminum foil (an imprint mold material 12) is fixed on a workbench 13 in a laser shock processing system. The rough abrasive paper 11 having 200 meshes is placed on a to-be-processed side of the imprint mold material 12. After the above operation is finished, a layer of black tape is pasted on an other side of the rough abrasive paper 11 as the absorption layer 10, and then the K9 glass is placed on a surface of the absorption layer as the constraint layer 9.

(3) Single-pulse laser shocking is performed on a to-be-processed area of the to-be-processed aluminum foil by using a laser shock forming technology (a laser beam first reaches the abrasive paper, and then reaches the aluminum foil). The laser shock forming technology includes one movement by a mechanical arm followed by one shocking by a pulse laser beam 8, that is, point-by-point processing.

(4) After the laser shocking, the absorption layer material and the constraint layer material on the surface of the aluminum foil are peeled off. When a surface of the aluminum foil that is in contact with the rough abrasive paper finally becomes a rough surface having a micron-structure of a size of a single laser spot, and a surface state of the obtained rough surface is same as that of the used rough abrasive paper having 200 meshes, a micron-imprint mold is obtained.

(II) Preparation of a Nano-Imprint Mold, Including the Following Steps:

(5) A pure aluminum foil material having a thickness about 0.05 mm and a smooth surface is selected as an imprint mold material. Before laser shocking, a black tape having a thickness about 0.5 mm is selected as an absorption layer, and K9 glass having a thickness about 3 mm is selected as a constraint layer. A used pulse laser is a circular beam having the following parameters: a wave length of 1064 nm, an energy of 2.4 J, a pulse width of 16 ns, and a diameter of 2 mm. A fine abrasive paper having 1000 meshes is used to prepare a nano-imprint mold.

(6) First, the pure aluminum foil (an imprint mold material 4) is fixed on a workbench 13 in the laser shock processing system. The fine abrasive paper 5 having 1000 meshes is placed on a rough surface 14 of the imprint mold material 4. After the above operation is finished, a layer of black tape is pasted on an other side of the fine abrasive paper 5 as the absorption layer 3, and then the K9 glass is placed on a surface of the absorption layer as the constraint layer 2.

(7) Step (3) and step (4) are repeated, and the nano-imprint mold is obtained after steps are finished.

(III) Preparation of a Hard Coating, Including the Following Steps:

After the laser shocking, an alumina coating of 0.1 mm is deposited on the microstructure rough surfaces of the micron-imprint mold and the nano-imprint mold, to increase the strength of the micron-structure rough surface and the nano-structure rough surface of the aluminum foil.

(IV) Micronization of a Surface of a Pure Aluminum Sheet, Including the Following Steps:

(a) The micron-imprint mold prepared in step (4) is fixed on the workbench in the laser shock processing system. A side of the imprint mold that has the micron-structure is placed on the surface of the pure aluminum sheet. Then, a layer of black tape is pasted on a side of the pure aluminum sheet that is in a pulse laser incident direction, and the K9 glass is placed on the black tape.

(b) Single-pulse laser shocking is performed on a to-be-processed area by using the laser shock forming technology (a laser beam first reaches the pure aluminum sheet, and then reaches the imprint mold), to reprint the micron-structure on the surface of the imprint mold to the surface of the pure aluminum sheet.

(c) The pure aluminum sheet after the reprinting in step (b) is cleaned to obtain a surface-micronized material.

(V) Nanonization of the Surface of the Pure Aluminum Sheet, Including the Following Steps:

(d) The surface-micronized material obtained in step (c) is fixed on the workbench of the laser shock processing system. A layer of stearic acid is paved on a surface of the surface-micronized material that has the micron-structure, then the nano-imprint mold prepared in step (7) is placed on the stearic acid, a layer of black tape is pasted on a side of the imprint mold that is in a pulse laser incident direction, and then the K9 glass is placed on the black tape.

(e) Single-pulse laser shocking is performed on a to-be-processed area by using the laser shock forming technology (a laser beam first reaches the imprint mold, and then reaches the pure aluminum sheet), to reprint the nano-structure on the surface of the imprint mold to the surface of the surface-micronized material, and a low-surface-energy coating is pressed on the surface.

(f) The pure aluminum plate after the reprinting in step (e) is cleaned to obtain a surface-micronized and nanonized functional aluminum sheet.

The above descriptions are merely preferred embodiments of the present invention and are not intended to limit the present invention. A person skilled in the art may make various alterations and variations to the present invention. Any modification, equivalent replacement, or improvement made and the like within the spirit and principle of the present invention shall fall within the protection scope of the present invention.

What is claimed is:

1. A method for roughening a surface of a metal material by using a laser shock forming technology, comprising:
    preparing a micron-imprint mold, comprising:
        shocking a first abrasive paper by using the laser shock forming technology, and reprinting a micron-scale microstructure on a surface of the first abrasive paper to a surface of a material of a first imprint mold, to obtain the micron-imprint mold;
    preparing a nano-imprint mold, comprising:
        shocking a second abrasive paper by using the laser shock forming technology, and reprinting a nano-scale microstructure on a surface of the second abrasive paper to a surface of a material of a second imprint mold, to obtain the nano-imprint mold; wherein,
    a mesh number of the surface of the first abrasive paper with the micron-scale microstructure is different from a mesh number of the surface of the second abrasive paper with the nano-scale microstructure;
    pre-processing the surface of the metal material, comprising:
        carrying out a smooth treatment on the surface of the metal material;
    wherein, the metal material is the same as materials of the micron-imprint mold and the nano-imprint mold;
    preparing the micron-scale microstructure on the surface of the metal material, comprising:
        (a) placing the surface of the micron-imprint mold that has the micron-scale microstructure on the surface of the metal material; disposing an absorption layer material and a constraint layer material on a surface of the micron-imprint mold facing to an incident direction of a pulse laser;
        (b) carrying out a single-pulse laser shocking treatment on an area to be processed on the surface of the metal material by using the laser shock forming technology, to reprint the micron-scale microstructure on the surface of the micron-imprint mold to the surface of the metal material; and
        (c) carrying out a cleaning treatment on a reprinted surface of the metal material obtained from step (b), then obtaining a surface-micronized material; preparing the nano-scale microstructure on the surface of the metal material, comprising:
        (d) paving a material capable of reducing a surface energy on a surface of the surface-micronized material with the micron-scale microstructure, placing the surface of the nano-imprint mold that has the nano-scale microstructure on the material capable of reducing the surface energy, disposing the absorption layer material and the constraint layer material on the surface of the nano-imprint mold facing to the incident direction of the pulse laser, repeating the single-pulse laser shocking treatment in the step (b) and the cleaning treatment in the step (c), then obtaining a surface-nano-micronized material having a low-surface-energy coating.

2. The method according to claim 1, wherein preparing the micron-imprint mold comprises: using the first abrasive paper having the micron-scale microstructure as a base plate, superimposing the surface of the material of the first imprint mold with a surface of the base plate that has the micron-scale microstructure, disposing the absorption layer material and the constraint layer material on a surface of the first imprint mold facing to the incident direction of the pulse laser, and performing a shock imprinting by using the laser shock forming technology to reprint the micron-scale microstructure on the surface of the base plate to the surface of the material of the first imprint mold, then obtaining the micron-imprint mold.

3. The method according to claim 2, wherein the micron-scale microstructure on the surface of the micron-imprint mold and the nano-scale microstructure on the surface of the nano-imprint mold are reprinted by using the first abrasive paper and the second abrasive paper, to obtain a rough surface having a double-scale structure.

4. The method according to claim 3, wherein the first abrasive paper used to reprint the micron-scale microstructure has a surface roughness being in a range of Ra0.5 to Ra1, and the second abrasive paper used to reprint the nano-scale microstructure has a surface roughness being not higher than Ra0.2.

5. The method according to claim 1, wherein preparing the nano-imprint mold comprises: using the second abrasive paper having the nano-scale microstructure as a base plate, superimposing the surface of the material of the second imprint mold with a surface of the base plate that has the nano-scale microstructure, disposing the absorption layer material and the constraint layer material on a surface of the second imprint mold facing to the incident direction of the pulse laser, and performing a shock imprinting by using the laser shock forming technology to reprint the nano-scale microstructure on the surface of the base plate to the surface of the material of the second imprint mold, then obtaining the nano-imprint mold.

6. The method according to claim 1, wherein a thickness of the metal material is greater than 0.5 mm, and a thickness of the micron-imprint mold or the nano-imprint mold is less than the thickness of the metal material.

7. The method according to claim 1, wherein an implementation process of the laser shock forming technology comprises;
performing one shocking by a laser after every movement by a mechanical arm forming a point-by-point processing mode.

8. The method according to claim 1, wherein the smooth treatment comprises mechanical polishing or electrochemical polishing, and is required to be performed before roughing the surface of the metal material.

9. The method according to claim 1, wherein the absorption layer material is a black paint or a black tape.

10. A method of using a product prepared by the method according to claim 1, comprising: wherein the product is used for anti-snow accumulation and anti-icing of an outdoor metal article, anti-fouling and anti-corrosion of a ship shell, and anti-adhesion and anti-blocking of an inner wall of an oil pipeline.

* * * * *